Jan. 24, 1928.
Re. 16,860
M. K. ARMSTRONG
ART OF MAKING PLASTER BOARD
Original Filed March 15, 1919 3 Sheets-Sheet 1
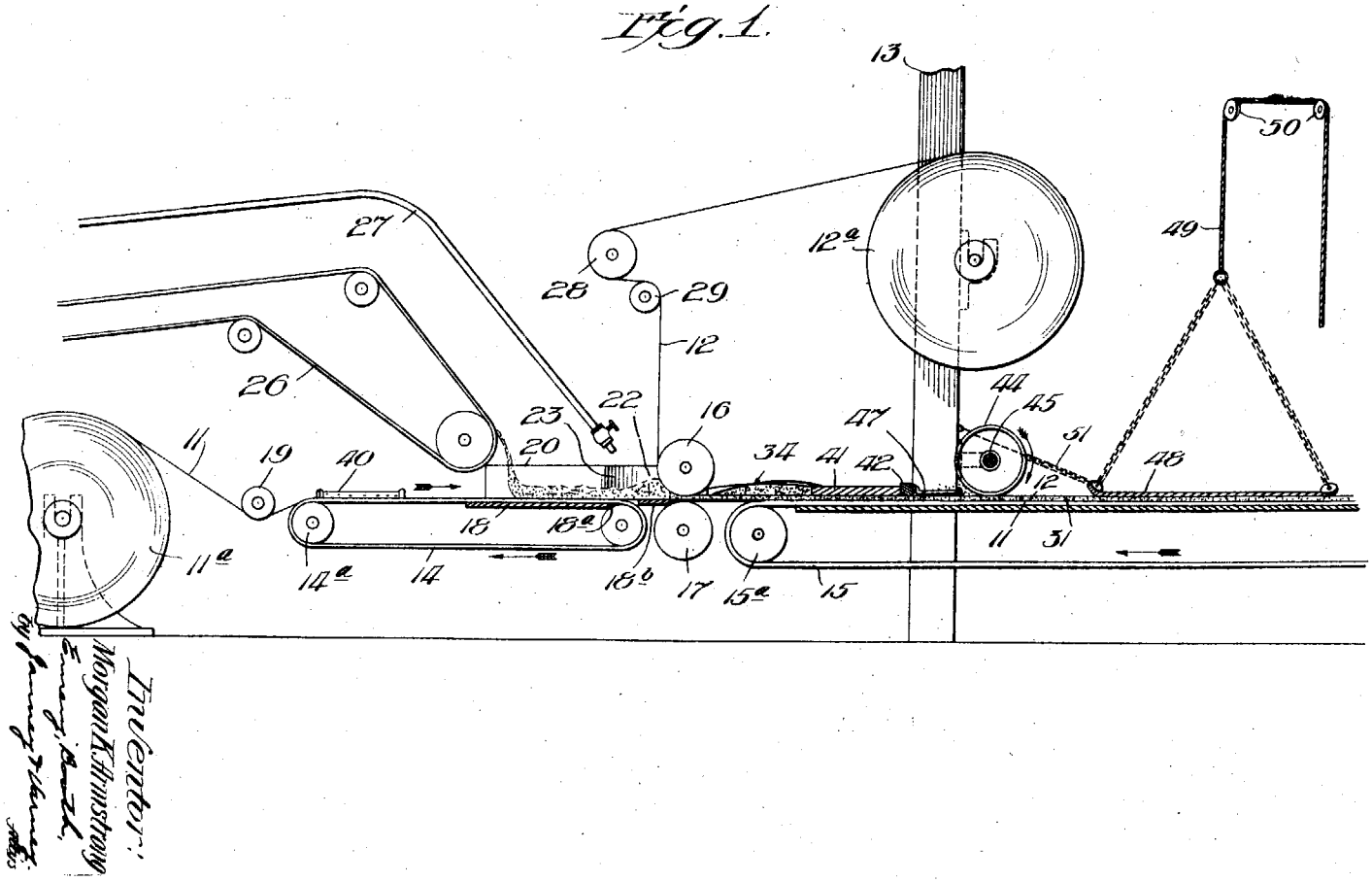

Jan. 24, 1928.
Re. 16,860
M. K. ARMSTRONG
ART OF MAKING PLASTER BOARD
Original Filed March 15, 1919 3 Sheets-Sheet 2
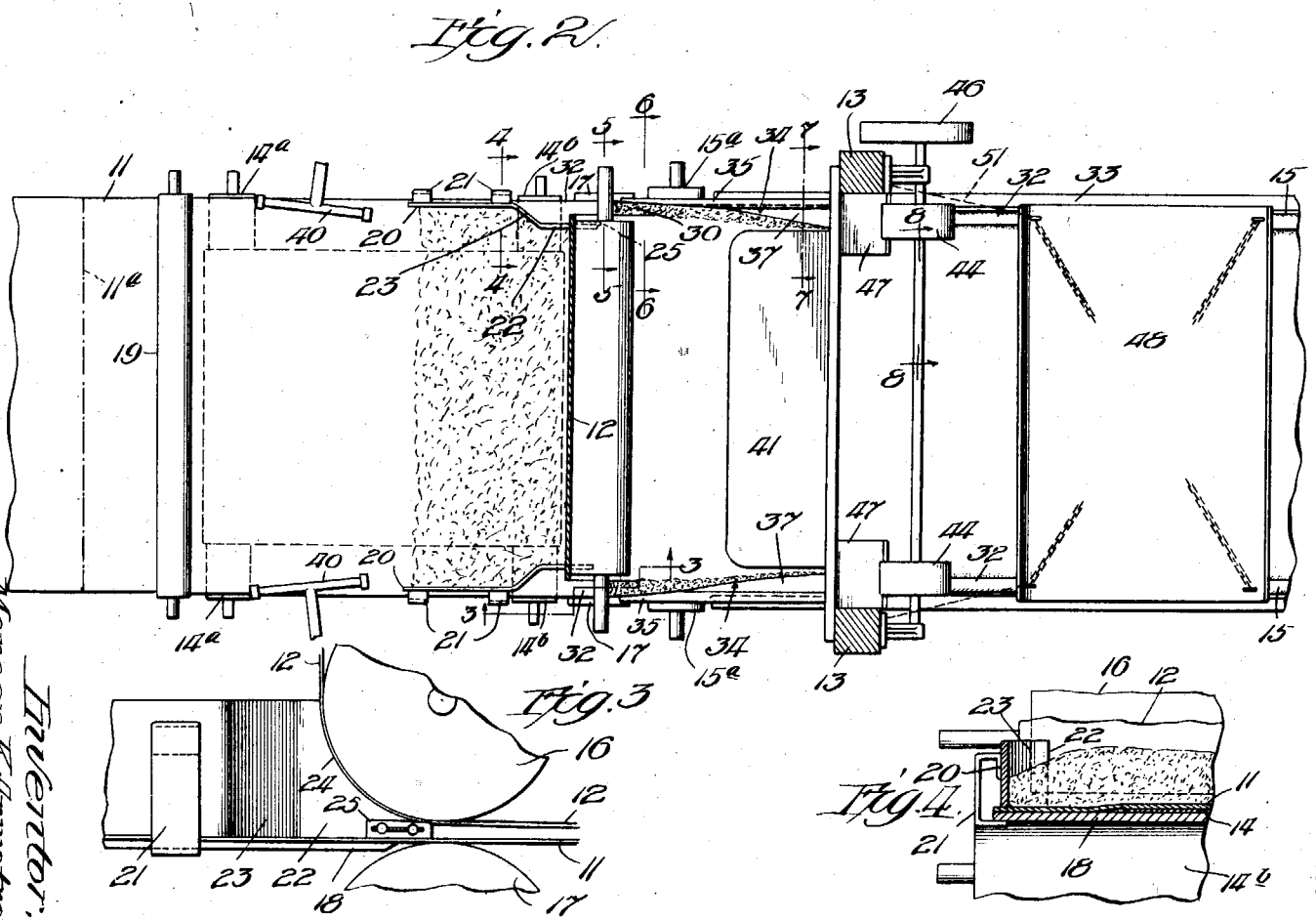
Inventor:
Morgan K. Armstrong
By Emery, Booth, Janney & Varney
Att'ys Jan. 24, 1928.
M. K. ARMSTRONG
Re. 16,860
ART OF MAKING PLASTER BOARD
Original Filed March 15, 1919
3 Sheets-Sheet 3
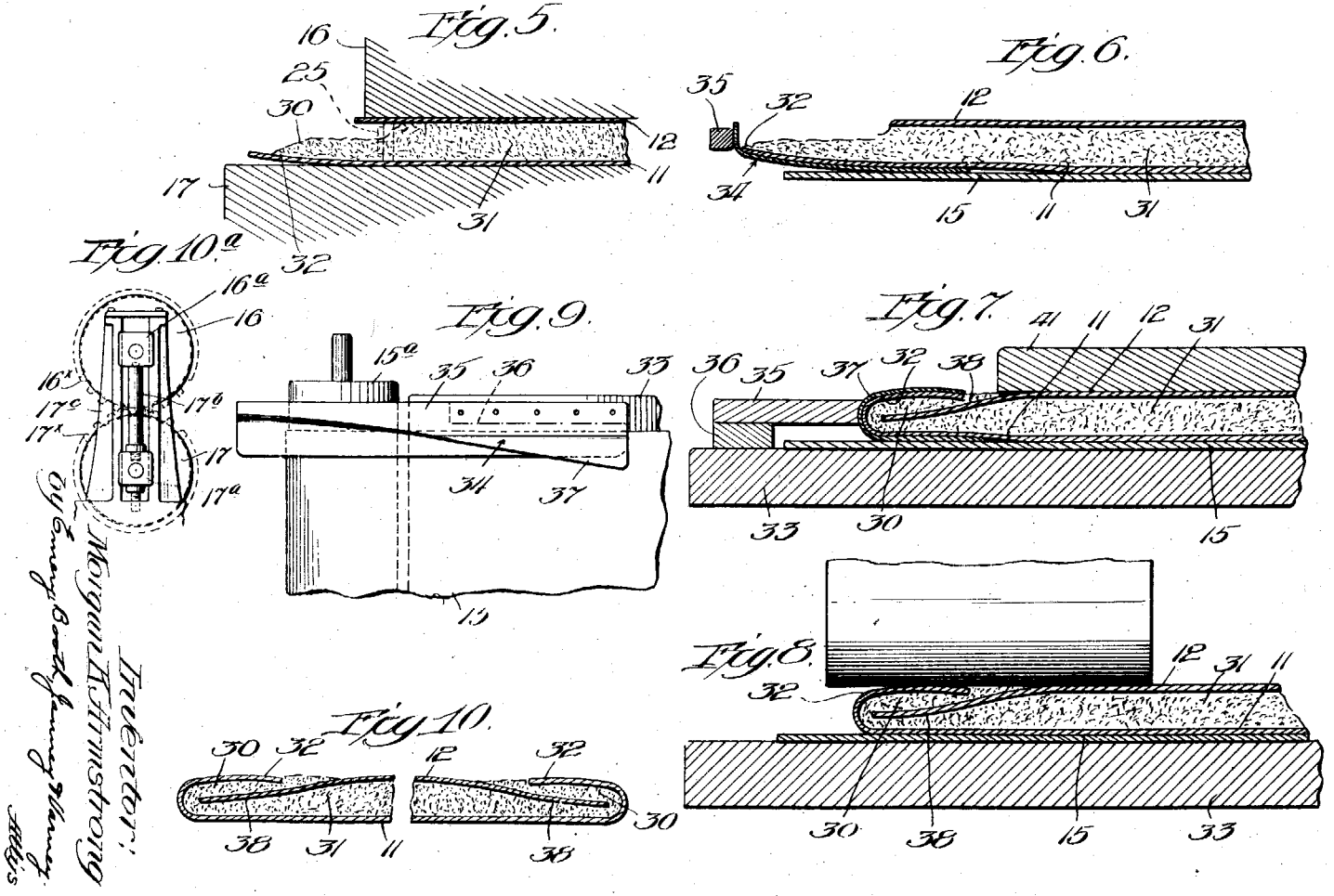
Inventor:
Morgan K. Armstrong
By Emery, Booth, Jenney & Varney
Attys Reissued Jan. 24, 1928.

Re. 16,860

UNITED STATES PATENT OFFICE.

MORGAN K. ARMSTRONG, OF HAMPTON, VIRGINIA, ASSIGNOR, BY MESNE ASSIGNMENTS, TO UNITED STATES GYPSUM COMPANY.

ART OF MAKING PLASTER BOARD.

Original No. 1,348,387, dated August 3, 1920, Serial No. 282,837, filed March 15, 1919. Application for reissue filed June 3, 1922. Serial No. 565,737.

This invention relates to the improvements in the art of making plaster board and is addressed to a novel process in the manufacture of such board. The invention further consists of the matters hereinafter described and more particularly pointed out in the appended claims.

The term "plaster board" is used herein in its generic sense, although the illustrative board shown in the drawings is technically termed a "wall board," inasmuch as it is adapted to form the finished surface of a wall exclusive of decoration.

The illustrative board consists generally of top and bottom covering sheets of paper or other fibrous material, preferably a Manila paper, either fully or partially sized, and an intermediate layer consisting of a plaster body to which said covering sheets adhere.

Heretofore one type of plaster board has been made by folding the margins of one cover sheet around the edges of and upon the opposite face of the plaster body and afterwards applying the opposite cover sheet, the margins of which overlie the folded margins. This method occasionally produced plaster board having edges reduced in strength.

Among other objects, the invention is intended to provide a novel and improved method of making plaster board having stronger edges and reinforced substantially throughout its width by the adhesion of the cover sheets to the plaster body or core.

The character of the invention may be best understood by reference to an apparatus employing one illustrative process embodying the principles of the invention.

The apparatus is illustrated in the accompanying drawings, in which:

Fig. 1 represents diagrammatically a longitudinal section through the apparatus;

Fig. 2 represents a top plan view of the apparatus;

Fig. 3 represents, on an enlarged scale, a section through Fig. 2, in a plane indicated by the line 3—3 of Fig. 2;

Fig. 4 represents a partial sectional view in a plane indicated by the line 4—4 of Fig. 2;

Fig. 5 represents, on a still larger scale, a partial transverse section through the apparatus, in a plane indicated by the line 5—5 of Fig. 2;

Fig. 6 represents a transverse section, in a plane indicated by the line 6—6 of Fig. 2;

Figs. 7 and 8 represent, respectively, transverse sections through the apparatus, in planes indicated by the lines 7—7 and 8—8 of Fig. 2;

Fig. 9 represents a top plan view of the bottom sheet edge-folding or turning horns;

Fig. 10 represents a transverse section through the finished board; and

Fig. 10ª is an end elevation of the spreading rolls illustrating the manner of mounting and operatively connecting them.

The principle of the improved process will be readily understood from a description of the illustrative apparatus and its mode of operation in producing one form of improved plaster board. This illustrative plaster board comprises a board-like body of plaster covered on the opposite faces with cover sheets of paper or the like which adhere thereto substantially through its width, thereby adhesively reinforcing the same from edge to edge, the edges of the plaster body being covered by cover sheet margins which are folded over said edges and cemented in place.

The method employed by the illustrative apparatus of making this type of board comprises in general: Placing a quantity of plastic material upon a cover sheet; spreading the plaster to a uniform depth and applying an opposite cover sheet; both sheets adhering thereto substantially through the width of the body of plaster; and then folding the margins of a cover sheet over the edges of the body of plaster and cementing said folded margins in place. In the illustrative board one cover sheet is made sufficiently wide to permit the margins thereof to be folded around the edges of the plaster body and upon the opposite face of the board.

In the present instance, the sheet or strip of paper which is made wide enough to cover the edges of the board is illustrated and referred to herein as the bottom sheet. The opposite sheet is referred to as the top sheet, although it will be obvious that the arrangement of the cover sheets may, if desired, be reversed.

In the drawings, the bottom and top sheets are designated respectively 11 and 12. Each of these sheets is fed from a roll,—one of the rolls 11ᵃ being mounted on a base or on the floor below the apparatus, and the other 12ᵃ being mounted on suitable posts or uprights 13 rising at the sides of the apparatus. The bottom sheet 11 in its continuous advance through the apparatus, is supported by suitable endless belts 14 and 15,—the first being located near the roll of paper 11ᵃ and at the rear of the spreading rolls shortly to be referred to, and the other, 15, being located more remotely from the paper roll and in front of said spreading rolls.

The belt 14 is mounted on longitudinally spaced rolls 14ᵃ and 14ᵇ, and the belt 15 on similar spaced rolls 15ᵃ and a second roll which is not shown in the drawings. Between the rolls 14ᵇ and 15ᵃ, there are located a pair of spreading rolls 16 and 17 which are spaced apart a distance equal to the total thickness of the board to be made. The bottom roll 17 is located with its top surface in the plane of the top laps of the two belts 14 and 15. This roll is mounted in a fixed bearing while the upper roll is mounted in vertically adjustable bearings, so that it is capable of a vertical adjustment to determine the thickness of the board. A suitable construction to provide this adjustment is shown in Fig. 10ᵃ, wherein the rolls are shown with their shafts mounted in journal boxes 16ᵃ, 17ᵃ, respectively, and with a vertically adjustable rod 17ᵇ interposed between the boxes. The boxes are mounted in pairs in an upright slotted standard 17ᶜ and the rolls are operatively connected to be driven together by means of gears 16ˣ, 17ˣ, with long teeth, which permit the adjustment without disengagement.

At the rear of the spreading rolls is located a platform 18 which extends from the bottom spreading roll 17 to a space some distance to the rear of said roll. This platform 18 is located with its top surface in a plane tangential to the top of the roll 17 and is made wider transversely than the belt 14, the top lap of which passes through a transverse slot 18ᵃ in the forward end of said board. (See Figs. 1 and 2.)

The bottom sheet thus advances from the supply roll 11ᵃ, over the top lap of the belt 14, over the part 18ᵇ of the platform 18 forward of said belt, over the bottom spreading roll 17 and thence to the top lap of the belt 15. A tension roll 19 is preferably provided intermediate the belt 14 and the supply roll 11ᵃ.

At each side of the platform 18 and projecting into the space between the spreading rolls 16 and 17, are located mold boards 20, 20. Said mold boards determine the width of the plastic body to be included between the layers of paper, and extend parallel to each other in the direction of the feed of the paper. In the present arrangement they are mounted with their bottom edges a distance above the top surface of the platform 18, sufficient to permit the thickness of the bottom sheet to pass underneath them, and are secured to said platform by means of overhanging brackets 21 attached to its edges.

The forward ends 22 of the mold boards 20 may be offset inwardly, that is to say, toward each other, from the plane of the main length of said boards, said forward ends 22 being connected to said main lengths by means of inwardly inclined parts 23. The top edges of said forward ends 22 are curved, as indicated at 24, so that they may be made to closely engage the paper of the top sheet when it passes around the top roll, as will presently appear. Longitudinally adjustable plates 25 are attached to the outer faces of the forward ends of said mold boards. The forward ends of the mold boards themselves terminate considerably to the rear of the plane of the axes of the spreading rolls 16 and 17. The plates 25 may be adjusted so as to vary the distance between the ends thereof and the vertical plane through the axes of the rolls. Ordinarily, in the operation of the apparatus, these plates are not extended to a position forward of said vertical plane.

The plastic mix is deposited upon the advancing bottom sheet 11 by means of a belt conveyer 26 suitably supported above the platform 18 from a hopper (not shown). A water pipe 27 is arranged to discharge water upon the plastic mix on the bottom sheet, in case more water is required than has already been put into the mix when it is delivered to the belt conveyer.

Operatives on either side of the apparatus mix and roughly spread the plastic mixture over the bottom sheet and remove any hard particles that may have set and have become detached from the mold boards, after first adhering thereto. As the bottom sheet advances toward the spreading rolls, the plastic mix is crowded toward the center and is edged up by the mold boards and is dammed up against the spreading rolls, at the same time leaving the marginal parts of the bottom sheet which project beyond the mold boards, substantially free of the plastic mix.

The top sheet 12 is fed from its supply roll 12ᵃ and then about tension rolls 28, 29 and then downwardly and forwardly about the upper spreading roll 16. The upper spreading roll 16 is shorter (see Fig. 5) than the bottom spreading roll and is somewhat shorter than the width of the top sheet, but extends at each end beyond the planes of the front ends of the mold boards. The top sheet is applied and the plastic body is spread evenly in passing the top and bottom sheets between the spreading rolls. As the board approaches the common axial plane of the spreading rolls, it comprises a bottom sheet, having marginal parts on which there is no plastic material extending beyond a plastic body on said sheet, a plaster body and a top sheet applied thereto, having its edges projecting slightly beyond the same. Since the plates 25 do not project into the common diametric plane of the spreading rolls, where the distance between the rolls is least, but terminates short of said plane, a little of the plastic mixture will be spread out (as the board passes beyond the ends of the mold boards) over the marginal parts of the bottom sheet (as shown in Fig. 5), the escaping plaster being indicated by the numeral 30 and the main body of the plaster being indicated by the numeral 31. By having the top roll 16 somewhat shorter than the width of the top sheet, the plastic mix is prevented from collecting on the ends of said roll and hardening thereon.

After the board passes the spreading rolls, the marginal parts of the bottom sheet (which will hereinafter be referred to by the numeral 32), with the small amount of plaster spread out thereon, are turned over to cover the edge of the plaster body and upon the top sheet by means of folding horns which will now be described.

A table 33 is located forward of the roll 15[a] (which supports the rear loop of the endless belt 15) with its surface in supporting engagement with the top lap of the belt 15. Said table is wider transversely than the belt, and is somewhat wider than the bottom sheet of the plaster board. At each side of said plaster board are mounted folding horns 34 of familiar construction, said horns at their rear ends being substantially of the cross section shown in Fig. 6, and at their front ends, being of the section shown in Fig. 7. Said horns are mounted on an overhanging block 35 attached to longitudinal strips 36 fixed at the sides of the table 33. The front end of each horn, as will be seen, has its turned-over part 37 bent so that it is somewhat inclined from the outer edge of the board to and below the horizontal, as clearly shown in Fig. 9. As the board is drawn forward, the marginal parts 32 of the bottom sheet are caught by the rear ends of the horns and said parts 32 with the plaster 30 are bent or turned over upon the top sheet, the several successive steps of the turning process being indicated in Figs. 5, 6 and 7.

In turning over the marginal parts 32, the plaster thereon acts to depress the marginal parts 38 of the top sheet, as clearly shown in Fig. 7, thus leaving a substantial body of plaster between the adjacent parts of the top sheet and of the turned-over margins of the bottom sheet.

When stiff or partially sized paper is employed, it is desirable to provide means for treating the margins of the paper, so that they may be more easily folded and will more readily remain in folded position, and not tend to unfold. In the illustrative apparatus, means are provided for softening the marginal parts of the bottom sheet before such margins pass the folding horns. Such means comprise steam pipes 40 placed near the rear end of the platform 18 in such a position that they are adapted to discharge jets of steam on the marginal edges of the sheet in order to soften them.

To prevent buckling or bending upward of the plaster board or of the top sheet, during the action of the folding horns, an anti-buckling plate 41, which is narrower than the top sheet 12, is placed to bear on the top of the plaster board, said plate simply resting by its weight on the top sheet and being prevented from moving forwardly with the advancing plaster board by means of a bar 42 which extends outwardly beyond the platform 33 and is engaged against the upright posts 13.

As the plaster board passes beyond the folding horns, there is apt to be a slight excess of plaster at the edges of the turned-over marginal parts of the bottom sheet (see Fig. 7). To remove this plaster and to smooth down any that remains in this position, I provide narrow rolls 44, one for each margin of the board. Said rolls are mounted on a shaft 45 to the end of which is attached a pulley 46. This pulley is connected up to drive the rolls 44 in a direction opposite to the advance of the board, so that they will in effect act as brushes to remove the excess plaster and to throw it rearwardly on trays or catch plates 47 located at the rear of said rolls and attached, as shown, to the bar 42. The rolls 44 are so located and are made of such a width with reference to the turned-over marginal parts of the bottom sheet of the plaster board that each roll will extend beyond its associated edge of the board on one side, and beyond the space occupied by the plaster to be removed on the other side, in order to take care of the usual weaving of the paper in the manufacture of the board.

After leaving the rolls 44, the board is passed under a weighted ironing or smoothing member 48. This is in the form of a plate which may be attached to cables 49 passing over pulleys 50, so that it may be lifted out of the road when threading the machine. Said ironing or smoothing member is wider than the plaster board so that it extends beyond both edges of said board. It is prevented from advancing and moving forward with the board by means of chains 51 which are attached to the upright posts 13. The said ironing member, as the name applied to it suggests, irons out and smooths any wrinkles or buckles that appear or tend to form in the plaster board.

In the making of the board the sheets are preferably so proportioned that the marginal parts 38 of the top sheet approach as nearly as may be the edges of the board, thus not only giving all the reinforcing strength to the edges of the board that may be obtained by this construction, but also insuring three thicknesses of paper adjacent the edge of the board to be engaged when nailing the board in place.

While in describing the method for making the board, I have referred to paper as the preferred coverings for the plaster body, it will be understood that the invention is not limited thereto, as sheets or strips of any material adaptable to the purpose may be used, and I therefore, in claiming the process, refer to the sheets inclosing the plastic body of the board, as fibrous material.

Obviously the improved method may be performed by other means or apparatus than the illustrative apparatus referred to herein and is capable of contemplation apart from the particular means or apparatus employed for performing it. Moreover, the method is not limited to the production of the specific article herein illustrated but the principles thereof may be applied in making other forms of plaster board or the like. Also, it is not indispensable that all the steps of the illustrative method be employed conjointly in any given instance, as certain features of the method may be employed advantageously in various combinations and sub-combinations of steps.

I claim—

1. The continuous process of making plaster board, which consists of advancing a bottom sheet of fibrous material, of superposing thereon a plastic mixture to form the body of the board, of confining said plastic mix in such a manner on said bottom sheet as to leave marginal parts of said sheet exposed at each side of the same beyond the intended width of the plaster board, of superposing a narrower top sheet of fibrous material on said plastic mix and at the same time spreading the plastic mix evenly over the bottom sheet to the intended thickness of the board, of turning over the projecting marginal parts of the bottom sheet to overlap the marginal parts of the top sheet, first spreading on said projecting parts a small amount of plaster so that said small amount is turned over with the said projecting marginal parts of the bottom sheet upon the marginal parts of the top sheet, the turning-over process being continued so as to depress the marginal parts of the top sheet, and of ironing out and smoothing the board to thoroughly adhere the top and bottom sheets to the body.

2. The continuous process of making plaster board, which consists of advancing a bottom sheet of fibrous material and softening the marginal parts thereof, of depositing a plastic mixture on said bottom sheet to form the body of the board, in such manner as to leave said softened marginal parts bare and exposed, of superposing a narrower top sheet of fibrous material on said plastic mixture and at the same time spreading the mixture evenly over the bottom sheet to the desired thickness, of applying a small amount of a lesser thickness of the plastic mixture to the softened, exposed margins of the bottom sheet, of turning over said softened marginal parts with the plastic mixture thereon, upon the marginal parts of the top sheet so as to overlap and depress the same, of smoothing out the waves or undulations in the thus far finished product, and of finally adhering the said top and bottom sheets to the plastic body.

3. The continuous process of making plaster board, which consists of advancing a bottom sheet of fibrous material and softening the marginal parts thereof, of depositing a plastic mixture on said bottom sheet to form the body of the board, in such manner as to leave said softened marginal parts bare and exposed, of superposing a narrower top sheet of fibrous material on said plastic mixture and at the same time spreading the mixture evenly over the bottom sheet to the desired thickness, in flowing upon the exposed softened marginal parts during the spreading of the plastic mixture, a small amount of said mixture, of turning over said softened marginal parts with the plastic mixture thereon, upon the marginal parts of the top sheet so as to overlap and depress the same, of smoothing out the waves or undulations in the board and of finally adhering the said top and bottom sheets to the plastic body.

4. The continuous process of making plaster board, which consists of advancing a bottom sheet of sized paper and in softening the sizing in the marginal parts thereof, of depositing a plastic mixture on said bottom sheet to form the body of the board, between its softened margins which are left bare and exposed, in superposing a narrower top sheet of paper on the plastic mixture on the bottom sheet and at the same time flowing a small amount of plastic mixture upon the softened, exposed margins of the bottom sheet and spreading the plastic mixture evenly over that part of the bottom sheet between said softened margins, of turning over said softened margins, with the small amount of plastic mixture thereon, on to the marginal parts of the top sheet so as to overlap and depress the same, and of ironing and smoothing out the thus far finished product, to thoroughly adhere the said top and bottom sheets of paper to the plastic body.

5. The continuous process of making plaster board, which comprises advancing a bottom sheet of fibrous material, superposing thereon plastic material to form the body of the board, confining said plastic material in such a manner on said bottom sheet as to leave marginal parts of said sheet exposed at each side of the same beyond the intended width of the plaster board, superposing a narrower top sheet of fibrous material on said plastic mix and spreading the plastic mix evenly over the bottom sheet to the intended thickness of the board, turning over the projecting marginal parts of the bottom sheet upon the marginal parts of the top sheet, first spreading on said projecting parts a quantity of plaster so that said plaster is turned over with the said projecting marginal parts of the bottom sheet upon the marginal parts of the top sheet, the turning-over process being continued so as to depress the marginal parts of the top sheet.

6. The method of making plaster board which comprises, depositing plastic material upon a bottom cover sheet, spreading said plastic material uniformly upon said bottom sheet, placing a cover sheet upon said plastic material, folding the margins of the bottom sheet over the margins of the top sheet, but first weakening the stiffness of said margins so as to fold more readily, and then cementing said folded margins in place.

7. The method of making plaster board which comprises, depositing plastic material upon a bottom cover sheet, spreading said plastic material uniformly upon said bottom sheet, placing a cover sheet upon said plastic material, treating the margins of said lower sheet so as to fold more readily, folding said margins over the margins of the top sheet and securing the same in place.

8. A method of making plaster board or the like which comprises depositing plastic material on a continuously moving cover sheet, confining said plastic material to a width less than the width of said sheet, placing a narrow top sheet on said plastic material and spreading the latter over the first sheet to the intended thickness of the board, folding the margins of the first sheet to overlap the margins of the top sheet, first spreading a small amount of plaster between the overlapping margins to seal said folded margins in place.

9. A method of making plaster board or the like which comprises depositing plastic material on a continuously moving cover sheet, applying a top cover sheet over the plastic material, providing a slight amount of plastic material along the margins of the first sheet and folding said margins so as to lap the margins of the top sheet and adhering the same thereto by means of the plastic material on said margins.

10. The method of making a covered edge plaster board which is characterized by assembling continuously travelling cover sheets with a mass of plaster between and applying pressure to the assembled elements to cause the plaster to spread unobstructed to an even depth throughout the intended width of the board, and then folding cover sheet margins over the plaster at the edge of the board to provide a covered edge board, thereby avoiding any obstruction to the lateral flow of the plaster.

11. The method of making a covered edge plaster board by the continuous process which is characterized by deferring the folding of the cover sheet margins to cover the edge of the plaster body of the board until the plaster has been spread to an even depth throughout the width of the board, thereby causing the edges of the board to be entirely filled with plaster unobstructed by any folded cover sheet margins.

12. A method of making plaster board which is characterized by assembling top and bottom cover sheets with an intervening body of plaster, applying pressure to cause the plaster to spread to an even depth throughout the intended width of the board and causing a quantity of plaster to spread upon the cover sheet margins, and then folding said margins with the plaster thereon upon the opposite face of the board and applying pressure to said margins whereby the plaster thereon depresses the underlying margins and provides a space for a substantial layer of plaster between the overlapping cover sheet margins.

MORGAN K. ARMSTRONG.